US010542818B2

(12) United States Patent
Keller et al.

(10) Patent No.: US 10,542,818 B2
(45) Date of Patent: Jan. 28, 2020

(54) CABLE ROUTING ARRANGEMENT AS WELL AS A FURNITURE ITEM AND FRAME WITH SUCH A MECHANISM

(71) Applicant: Vitra Patente AG, Birsfelden (CH)

(72) Inventors: Stefan Keller, Steinen-Hofen (DE); Helmut Schütt, Müllheim-Hügelheim (DE)

(73) Assignee: VITRA PATENTE AG, Birsfelden (CH)

( * ) Notice: Subject to any disclaimer, the term of this patent is extended or adjusted under 35 U.S.C. 154(b) by 117 days.

(21) Appl. No.: 15/786,415

(22) Filed: Oct. 17, 2017

(65) Prior Publication Data

US 2018/0110327 A1   Apr. 26, 2018

(30) Foreign Application Priority Data

Oct. 21, 2016   (EP) .................................... 16195093

(51) Int. Cl.
*A47B 37/00*   (2006.01)
*A47B 21/06*   (2006.01)
(Continued)

(52) U.S. Cl.
CPC .............. *A47B 21/06* (2013.01); *A47B 21/02* (2013.01); *B60R 16/0215* (2013.01);
(Continued)

(58) Field of Classification Search
CPC ......... A47B 21/02; A47B 21/06; F16L 3/015; F16L 3/23; F16L 3/26
See application file for complete search history.

(56) References Cited

U.S. PATENT DOCUMENTS 3,266,059 A * 8/1966 Stelle .......................... B25J 9/06
138/120
4,353,518 A * 10/1982 Taylor .................. H05K 7/1491
248/281.11
(Continued)

FOREIGN PATENT DOCUMENTS

DE   11 2014 002906 T5   3/2016
GB       1914 14163 A     6/1915
(Continued)

OTHER PUBLICATIONS

European Patent Office. European Search Report European Patent Application No. 17 197 424.9, dated Mar. 28, 2018.
European Search Report for EP 16 19 5093.6, dated Apr. 26, 2017.

*Primary Examiner* — Matthew W Ing
(74) *Attorney, Agent, or Firm* — Medler Ferro Woodhouse & Mills PLLC

(57) ABSTRACT

A cable routing arrangement for routing cables in an orderly fashion on a height-adjustable furniture item is disclosed that includes a rigid first routing element, a rigid second routing element, and a deformable connecting element. The first routing element has a first bearing arrangement that is configured to be pivotally connected to a top part of the furniture item. The second routing element has a second bearing arrangement that is configured to be pivotally connected to a base part of the furniture item. The first routing element and the second routing element can be interconnected via the connecting element in such a way that they are movable.

16 Claims, 3 Drawing Sheets

(51) Int. Cl.
*A47B 21/02* (2006.01)
*B60R 16/02* (2006.01)
*F16L 3/015* (2006.01)
*H02G 3/04* (2006.01)
*H02G 3/06* (2006.01)
*A47B 97/00* (2006.01)

(52) U.S. Cl.
CPC ............ *F16L 3/015* (2013.01); *H02G 3/0462* (2013.01); *H02G 3/0691* (2013.01); *A47B 2097/003* (2013.01); *H02G 3/0406* (2013.01); *H02G 3/0633* (2013.01)

(56) References Cited

U.S. PATENT DOCUMENTS

| | | | | |
|---|---|---|---|---|
| 5,499,946 | A * | 3/1996 | Valkering | B08B 15/002 454/63 |
| 5,527,217 | A * | 6/1996 | Engstrom | B08B 15/002 454/63 |
| 6,322,618 | B1 * | 11/2001 | Simms | B01D 46/0068 55/283 |
| 6,960,098 | B1 * | 11/2005 | Tseng | A47B 21/06 108/50.02 |
| 9,018,527 | B2 * | 4/2015 | Komiya | H02G 3/0406 174/68.3 |
| 10,271,643 | B2 * | 4/2019 | Yamamoto | A47B 9/20 |
| 2014/0312754 | A1 * | 10/2014 | Hecht | A47B 9/04 312/309 |
| 2015/0351530 | A1 * | 12/2015 | Udagawa | H02G 3/0487 108/50.02 |
| 2017/0223778 | A1 * | 8/2017 | Hesselfeld | H05B 3/58 |

FOREIGN PATENT DOCUMENTS

| | | |
|---|---|---|
| WO | 2013/132710 A1 | 9/2013 |
| WO | 2014151755 A2 | 9/2014 |

\* cited by examiner

CABLE ROUTING ARRANGEMENT AS WELL AS A FURNITURE ITEM AND FRAME WITH SUCH A MECHANISM

TECHNICAL FIELD

The invention relates to a cable routing arrangement for organizing and routing cables on a furniture item, as well as to a furniture item with such a cable routing and a frame or desk frame with such a cable routing.

BACKGROUND OF INVENTION

When using furniture items and in particular office furniture such as desks or work tables, it is necessary to hook up electronic devices. For example, peripheral devices of computers such as monitors, keyboards, and computer mice are typically set up on desktops, whereas the computers themselves are set up under the desktops and the power supply is routed along the floor or from below. The power cables and communication cables are therefore frequently routed from below to the furniture item, for example to the desktop.

As the number of devices hooked up on the furniture item increases, it becomes harder to rout the cables on the furniture item in a neat and orderly fashion. Arranging and bundling the cables in a tube or conduit and routing the entire sheathed cable bundle on the furniture item is known to the prior art.

Irrespectively of wiring, height-adjustable furniture items have also been known for some time, in particular as workstations such as height-adjustable desks. The possibility of adjusting a work surface of the workstation in height; i.e., vertically, permits the workstation to be ideally adapted to the body size of an individual working at the workstation, which can be an important prerequisite for an ergonomic working posture.

While in the past a height adjustment was often only possible to a relatively limited extent, with the aim of compensating for size differences within the range of the statistically relatively small standard deviation of body sizes of sitting adults, desks with extended height adjustability, which when needed make it possible to work while standing are very popular today. Since prolonged working while standing may be perceived as unpleasant and/or tiring, it is important to be able to adjust the work surface between heights that are suitable for working while standing and ones that are suitable for working while sitting quickly and without complications. In particular, a frequent adjustment of the vertical position should be possible without any problem.

However, the aforesaid routing of cables in an orderly fashion is more difficult in such height-adjustable furniture items. So that neither the height adjustability of the furniture item nor the accessibility of the devices hooked up thereon is adversely impacted, the cables must be long enough to reach the furniture item in the highest possible setting thereof. Accordingly, relatively long cables are typically used for height-adjustable furniture items. However, when the furniture items are lowered or when the furniture items equipped with such relatively long cables are not in their highest position, then the cables, which may be grouped in a cable conduit, generally run in any direction. The cables may in particular dangle to a certain extent, which makes it difficult to organize the cables and is annoying to a user of the furniture item or desk. Furthermore, repeated height adjustments may cause the cables to fold together a different way each time, which can lead to a tangling or a kinking of the cables. The cables may be damaged as a result.

The problem addressed by the following invention is therefore that of proposing a mechanism or system with which cables are routed in a neat and orderly fashion on height-adjustable furniture items in every height position.

SUMMARY OF THE INVENTION

According to the invention, the problem is solved by a cable routing arrangement as defined by the features of independent claim 7, as well as by a furniture item as defined by the features of independent claim 1 and a frame as defined by the features of independent claim 4. Advantageous alternative embodiments of the invention are subject of the dependent claims.

An aspect of the invention relates to the following: A cable routing arrangement for the orderly routing of cables on a height-adjustable furniture item comprises a rigid first routing element, a rigid second routing element, and a deformable connecting element. The first and the second routing elements each have a first and a second bearing arrangement, respectively, by means of which they can each be pivotally connected to a top part of the furniture item. The first routing element and the second routing element are movably interconnectable or interconnected via the connecting element.

In connection with the invention, the term "cable" can in particular refer to wires and connecting lines such as power cables, connection cables, or the like. However, it can also encompass other cable-like structures such as cords or the like, which can typically be wound.

The first and second bearing arrangements can in particular enable an articulated or hinge-like connection of the routing elements to the top part or to the base part. This enables the routing elements to pivot in a variable manner, depending on the height position of the top part relative to the base part. In particular, the first and second routing elements can be pivoted relatively far inwardly if the top and base parts are relatively close together; more specifically when the top part is situated in a relatively low height position. In an analogous fashion, the first and second routing elements can be pivoted relatively far outwardly if the top and base parts are relatively far apart; more specifically when the top part is situated in a relatively high height position. Figuratively speaking, the first routing element, the second routing element, and the connecting element can be jointly configured in the manner of a leg, wherein the first routing element corresponds to a thigh, the second routing element corresponds to a lower leg, and the connecting element corresponds to a knee.

The first and second bearing arrangements can thus be configured in the manner of hinge joints, for example. They can each also comprise an axle element such as an axle rod section, the latter extending through a corresponding opening, borehole, or other guide in the associated top part or base part.

In connection with the invention, the term "rigid" can mean that the first and second routing elements are essentially stable in shape. In other words, they are essentially able to maintain their shape in space, even when they support cables or otherwise. To a certain extent they can also be elastic or deformable, as long as they are essentially able to maintain their basic or predefined shape.

In contrast, the connecting element is malleable or deformable. The connecting element can in particular be deformable in comparison to the first and second routing elements. If the first and second routing elements are interconnected via the connecting element, in the event of a movement of the first and second routing elements relative to one another the connecting element can be deformed, whereas the two routing elements essentially maintain their shape.

The cable routing arrangement according to the invention makes it possible for a routing of the cables from the top part of the furniture item to the base part of the furniture item, or vice versa, to be predefined in every, in particular vertical, position of the top part in relation to the bottom part. It is thus also possible to maintain an essentially invariable path length of the cable between the top and base parts. In every height position of the top part in relation to the base part, it is thus possible for the cables to be always situated in a place where they rarely interfere with a user and where they are rarely in the way and there is little chance of them even being pinched. It is thus furthermore possible to prevent the cables from being shaped or rather folded together in a haphazard and always different manner. It is thus possible to avoid damage to the cables, for example due to kinking or tangling of the cables ("cable spaghetti"). In particular, the cable routing of the invention therefore ensures that cables are routed in an orderly and neat fashion on or in height-adjustable furniture items in every height position.

The connecting element is preferably elastically deformable. This enables the two routing elements to be restored to their starting position relative to each other every time. In particular it is thus possible to ensure that the two routing elements are oriented and/or positioned in a predefined and reproducible manner relative to each other in every height position of the top part relative to the bottom part.

The connecting element is thus preferably designed to be resilient. This enables an efficient and stable elastic deformation of the connecting element. The connecting element therefore advantageously has a helical spring. Such a helical spring enables an efficient and stable embodiment of the connecting element in a resilient or rather elastic embodiment.

The first routing element and the second routing element are preferably configured as elongate. Such elongate routing elements enable an orderly routing of the cables in an area where they pose little interference. In a height-adjustable table, for example, these elements enable the cables to be routed in a back leg region where they will not interfere with a user of the table.

Preference is given to arranging a first bearing arrangement near a first longitudinal end of the first routing element, a second bearing arrangement near a first longitudinal end of the second routing element, and to designing the connecting element to connect a second longitudinal end of the first routing element to a second longitudinal end of the second routing element. The first routing element and the second routing element each therefore advantageously have a rod section. Such a design of the routing elements and of the connecting element enables a simple and efficient embodiment of the cable routing arrangement according to the invention, particularly in a knee-like or leg-like form.

The cable routing arrangement preferably comprises a sheath with which the first routing element, the second routing element, and the connecting element can be enclosed. With such a sheath, the routing elements, the connecting element, and the cables can be encased or wrapped. This enables a simple and orderly consolidation of the cable routing arrangement, which can also be advantageous for aesthetic reasons.

The sheath is preferably configured as tube-like. Such a tube-like sheath or cable conduit permits a simple design of the sheath. The sheath can be unfoldable in order to enable efficient wrapping. It can also be partially open rather than completely closed. For example, this can also be preferable in order to simplify the process of folding or coiling the cable conduit in an orderly manner.

Another aspect of the invention relates to a height-adjustable furniture item with a base part that can be set on the floor, a top part, an adjustment mechanism, and a cable routing arrangement, in which a distance between the base part and the top part can be altered by means of the adjustment mechanism. The cable routing arrangement comprises a rigid first routing element, a rigid second routing element, and an elastic connecting element, wherein the first routing element is pivotally mounted on the top part, the second routing element is pivotally mounted on the base part, and the connecting element interconnects the first routing element and the second routing element in such a way that they are movable in relation to each other.

The furniture item can in particular be a table, or more specifically an office table or desk. It can also be a table composite in which several workstations or more specifically desks are combined. The top part can be a work surface or a desktop.

Another further aspect of the invention relates to a frame for a height-adjustable furniture item with a base part that can be set on the floor, a supporting part that can be mounted on a top part of the furniture item, an adjustment mechanism by means of which the distance between the base part and the supporting part can be altered, and a cable routing arrangement. The cable routing arrangement comprises a rigid first routing element, a rigid second routing element, and an elastic connecting element. The first routing element is pivotally mounted on the supporting part and the second routing element is pivotally mounted on the base part. The connecting element interconnects the first routing element and the second routing element in such a way that they are movable in relation to each other.

The cable routing arrangement of the furniture item according to the invention or of the frame according to the invention is preferably designed as described above. The furniture item according to the invention and the frame according to the invention each enable an efficient implementation of the effects and advantages described above in connection with the cable routing arrangement of the invention.

In the furniture item according to the invention or in the frame according to the invention, the first routing element is preferably mounted on the top part essentially vertically above the mounting of the second routing element on the base part. Such an arrangement enables a knee joint-like or leg-like design of the cable routing arrangement.

BRIEF DESCRIPTION OF THE DRAWINGS

Further advantageous aspects of the invention arise from the following description of exemplary embodiments of the invention, which refers to the schematic drawing. In particular, the cable routing arrangement of the invention, the furniture item of the invention, and the frame of the invention, respectively, shall be described in more detail in the following with reference to the appended drawings and with the aid of exemplary embodiments. Shown are.

DETAILED DESCRIPTION OF THE INVENTION

Figure 1:
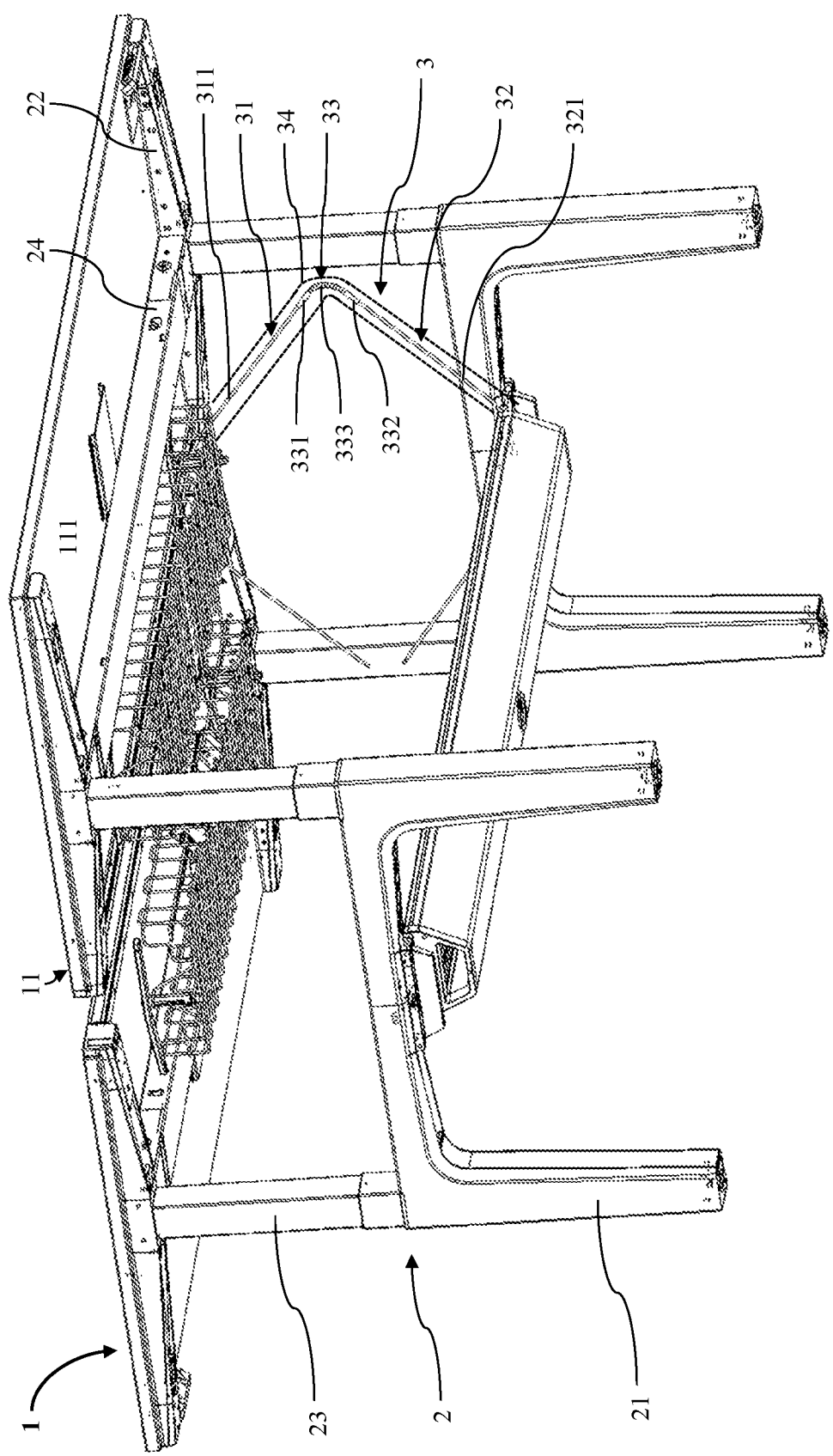
FIG. 1 a perspective view of an exemplary embodiment of a table composite according to the invention with an exemplary embodiment of a frame according to the invention with a cable routing arrangement according to the invention, in an upper height setting.

Certain expressions are used in the following description for practical reasons and must not be construed as limiting. The words "right", "left", "down" and "up" designate directions in the drawing to which reference is made. The expressions "inward", "outward", "below", "above", "left", "right", or the like are used to describe the arrangement of designated parts relative to one another, the movement of designated parts relative to one another, and the directions toward or away from the geometric centre of the invention as well as named parts of the same, as depicted in the figures. These relative spatial indications also include positions and alignments other than the ones depicted in the figures. For example, if a part depicted in the figures is rotated, then elements or features described as "below" are then "above". The terminology encompasses the words expressly mentioned above, derivatives thereof, and words of similar meaning.

In order to avoid repetitions in the figures and in the associated description of the different aspects and exemplary embodiments, certain features should be understood as common to different aspects and exemplary embodiments. The omission of an aspect from the description or from a figure does not mean that this aspect is lacking in the associated exemplary embodiment. Instead such an omission may be made for the sake of clarity and for avoiding repetitions. In this connection, the following specification applies to the entire further description: If reference signs are present in a figure for the sake of graphic clarity but not mentioned in the directly associated descriptive text, then reference shall be made to the explanation thereof in preceding figure descriptions. Furthermore, if reference signs are mentioned in the descriptive text directly associated with a figure but are not present in the associated figure, reference shall be made to the preceding and following figures. Similar reference signs in two or more figures stand for similar or identical elements.

Figure 2:
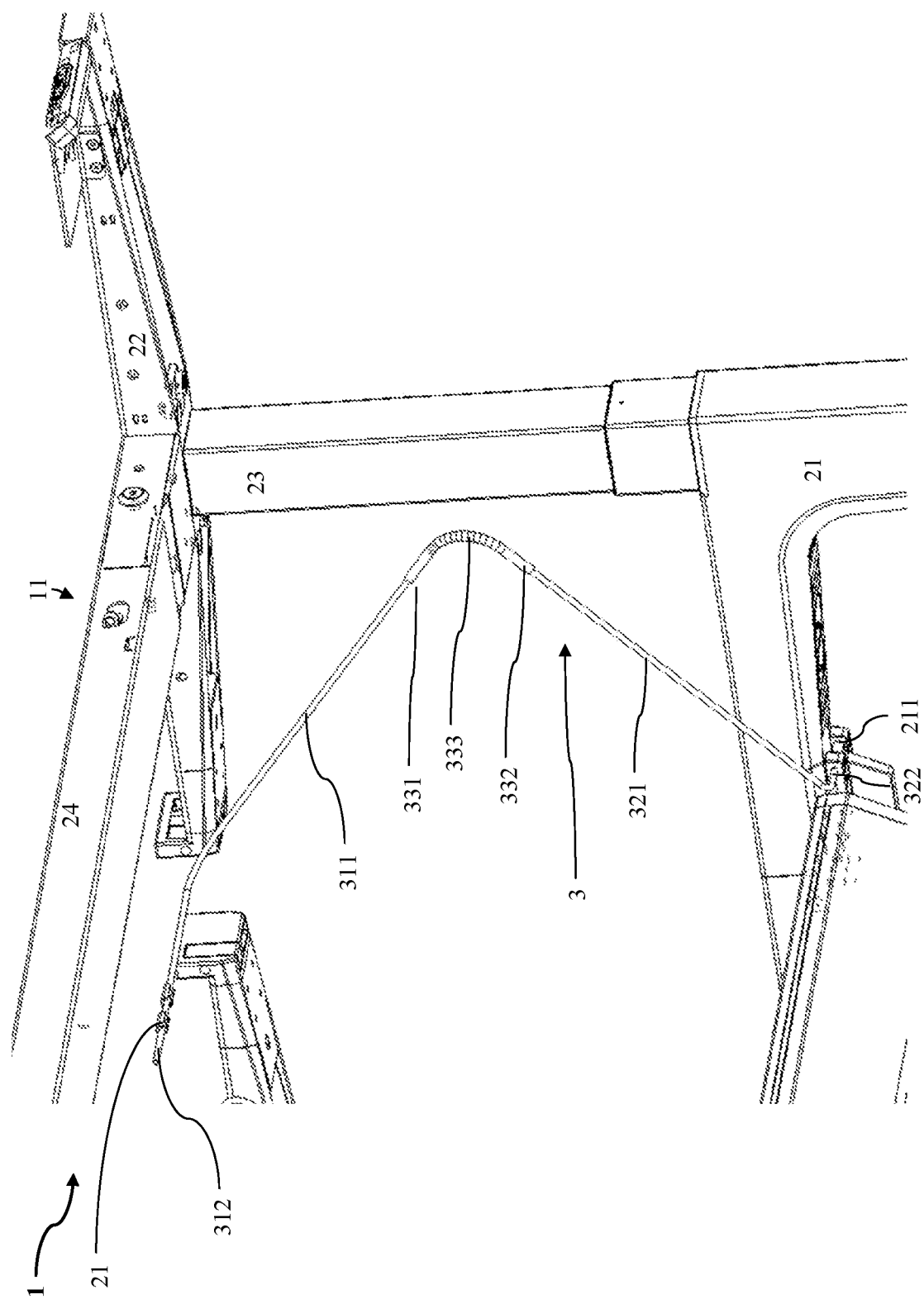
FIG. 2 a perspective view of a detailed section of certain components of the table composite of FIG. 1 in the upper height setting.
Figure 3:
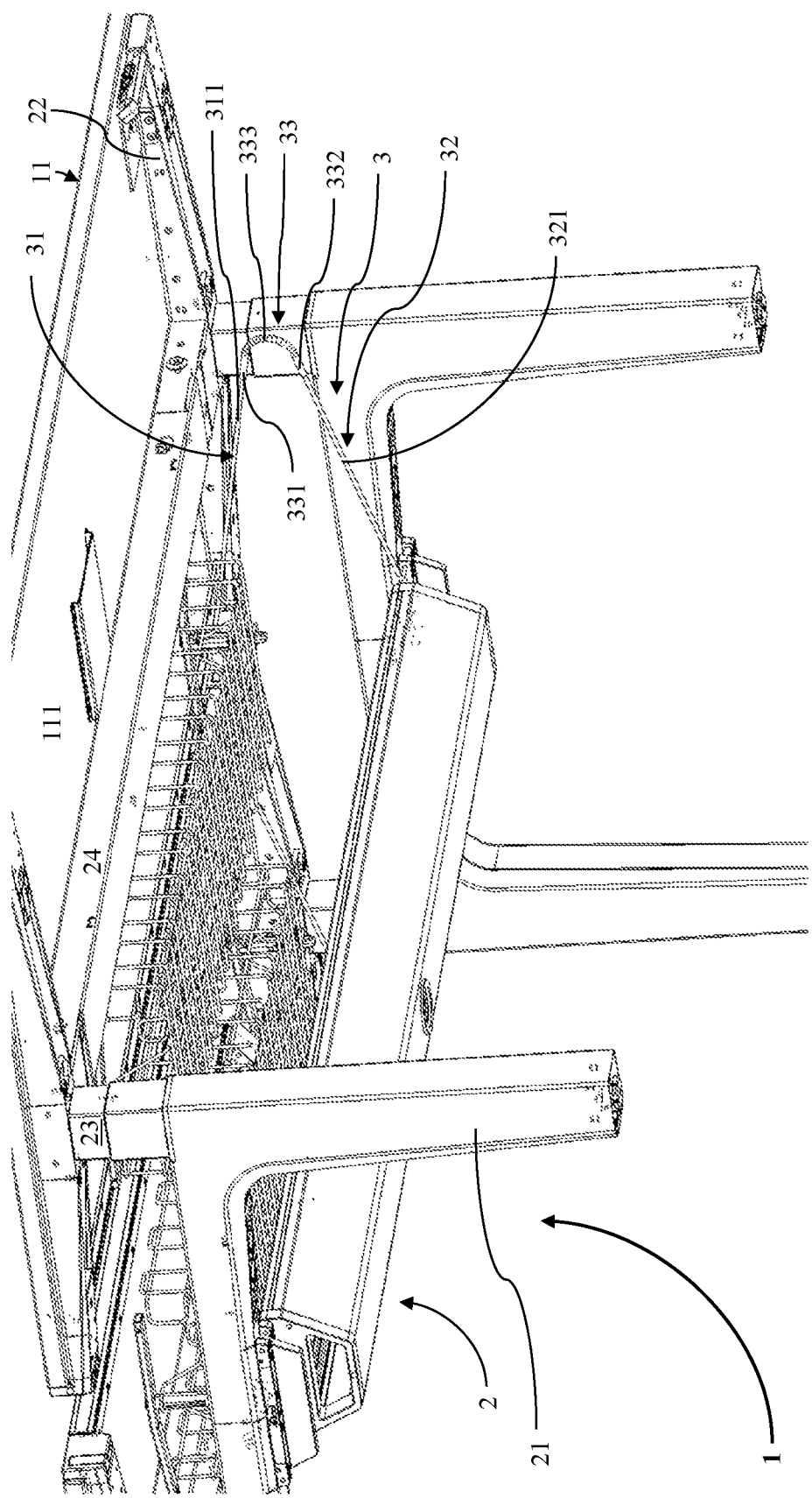
FIG. 3 a perspective view of a section of the table composite of FIG. 1 in a lower height setting.

FIG. 1 and FIG. 2 show a table composite 1 in an upper height setting as an exemplary embodiment of a furniture item according to the invention, which comprises an exemplary embodiment of a frame 2 according to the invention with a cable routing arrangement 3 according to the invention. The table composite 1 comprises two opposing desks 11 as workstations. The desks 11 comprise a common frame 2 and in each case a desktop 111 as a top part.

The frame 2 has two basically U-shaped base parts 21 aligned in parallel, which each form two supporting feet. The frame 2 and thus the table composite 1 are therefore set on the floor on four supporting feet. The frame 2 further comprises four supporting parts 22 aligned parallel to the associated base part 21, of which two in each case are stationarily interconnected by a cross member 24. One of the desktops 111 is mounted on each of the two supporting parts 22 interconnected by one of the cross members 24. Furthermore, the two supporting parts 24 interconnected by one of the cross members 24 are each connected by two telescoping legs 23 to the two base parts 21. The two telescoping legs 21 of one of the two desktops 111 can be jointly retracted and extended in synchronous fashion by means of an adjustment mechanism. It is thus possible to alter a distance between the respective desktops 111 and the base parts 21. The desks 11 or more specifically their desktops 111 can thus be adjusted in height.

The frame 2 further comprises two cable routing arrangements 3, of which one is assigned to one of the desktops 111 in each case and of which only the front one is depicted in its entirety in FIG. 1. The two cable routing arrangements 3 are each designed in analogous fashion with an elongate rigid first routing element 31 and an elongate rigid second routing element 32. The first routing elements 31 each have a first guide rod 311 running diagonally or essentially diagonally toward a front desk edge, which at its upper longitudinal end transitions into a first axle rod 312 extending at a right angle from itself toward the centre of the associated desktop 111 as a bearing arrangement. The second routing elements 32 each have a second guide rod 321 running diagonally or essentially diagonally toward the front desk edge, which at its lower longitudinal end transitions into a second axle rod 322 extending outwardly at a right angle from itself as a bearing arrangement.

The cable routing arrangements 3 each further comprise a connecting element 33 with a helical spring 333, which transitions into a first connecting sleeve 331 at its upper longitudinal end and into a second connecting sleeve 332 at its lower longitudinal end. The first connecting sleeves 331 of the connecting elements 33 are each connected to the lower longitudinal end of the first guide rod 311 of the associated first routing element 31. In analogous fashion, the second connecting sleeves 332 of the connecting elements 33 are each connected to the upper longitudinal end of the second guide rod 321 of the associated second routing element 32. The helical spring 333 in the context is elastically bent and thus forms a variable connecting angle between the first routing element 31 and the second routing element 32.

The base parts 21 are furthermore provided with bearing bores 211, wherein the second axle rods 322 of the second routing elements 32 each extend through two bearing bores 211. The second routing elements 32 are thus attached to the associated base part 21 in a pivotal or articulated manner. On their undersides, the desktops 111 are each equipped with two bearing sleeves 21 that are open at the bottom, into which the first axle rod 312 of the associated first routing element 31 is snapped. The first routing elements 31 are thus attached to the associated desktop 111 in an articulated or pivotal manner.

The cable routing arrangements 3 each further comprise a flexible cable conduit 34, which each encase or more specifically enclose the first guide rod 311 of the associated first routing element 31, the second guide rod 321 of the associated second routing element 32, and the associated connecting element 33. When the cable routing arrangements 3 are in use, in each case cables that are routed to the respective desktop 111 are also wrapped in the cable conduit 34.

The first routing element 31, the connecting element 33, and the second routing element 32 jointly form a leg in each case, wherein the connecting element 33 represents the knee, the first routing element 31 represents a thigh, and the second routing element 32 represents a lower leg. In the position shown in FIG. 1, the desktops 111 are set relatively high in, for example, a standing position. The cable routing arrangements 3 are therefore relatively elongated. The angles between the first guide rods 311 and the desktops 111 as well as between the first guide rods and the second guide rods 321 are each relatively obtuse or wide.

The desks 11 are shown in a low height setting in FIG. 2. The desktops 111 are set relatively low in, for example, a sitting position. The cable routing arrangements 3 and in particular their connecting elements 33 or rather the helical springs 333 thereof are relatively strongly bent as a result. The angles between the first guide rods 311 and the desktops 111 as well as between the first guide rods and the second guide rods 321 are each relatively acute or narrow. In comparison to the upper height setting shown in FIG. 1, the first routing elements 31 are pivoted in relation to the desktop 111 or to the supporting parts 22 and the second routing elements 32 are pivoted in relation to the base part 21 toward the front edge of the associated desktop 111.

Although the invention is depicted and described in detail by means of the figures and the associated description, this depiction and this detailed description are to be understood as illustrating and exemplifying, but not limiting, the invention. In order not to embellish the invention, in certain cases well-known structures and techniques may not be shown and described in detail. Obviously persons skilled in the relevant art can make changes and modifications without exceeding the scope of the following claims. In particular, this invention covers further exemplary embodiments with any combinations of features that may deviate from the explicitly described combinations of features.

This disclosure also comprises embodiments with any combination of features that are mentioned or shown in the preceding or following with regard to different embodiments. It also comprises individual features in the figures, even if they are shown therein in connection with other features and/or not mentioned in the preceding or following. The alternatives to embodiments and individual alternatives to the features thereof described in the figures and in the description may also be excluded from the subject matter of the invention or from the disclosed subject matter. The disclosure comprises embodiments that exclusively comprise the features described in the claims or in the exemplary embodiments, as well as embodiments that comprise additional, other features.

In addition, the expression "comprise" and derivatives thereof do not exclude other elements or steps. The indefinite article "a" or "an" and derivatives thereof likewise do not exclude a plurality. The functions of several of the features listed in the claims can be fulfilled by a unit or by a step. In particular, the terms "essentially", "ca.", "approximately" and the like used in connection with a property or a value also define the property precisely or define the value precisely. When used in connection with a given numerical value or -range, the terms "ca" and "approximately" can refer to a value or range that lies within 20%, within 10%, within 5%, or within 2% of the given value or range.

What is claimed is:

1. A height-adjustable furniture item comprising:
    a base part that can be set on the floor;
    a top part;
    an adjustment mechanism; and
    a cable routing arrangement,
    wherein a distance between the base part and the top part can be altered by means of the adjustment mechanism,
    wherein the cable routing arrangement comprises
        a rigid first routing element having a first bearing arrangement configured as a hinge joint,
        a rigid second routing element having a second bearing arrangement configured as a hinge joint, and
        an elastic connecting element,
    wherein the first routing element is mounted on the top part via the hinge joint to provide an articulated or hinged connection therebetween,
    wherein the second routing element is mounted on the base part via the hinge joint to provide an articulated or hinged connection therebetween, and
    wherein the connecting element interconnects the first routing element and the second routing element in such a way that they are movable in relation to each other.

2. The furniture item according to claim 1, wherein the first routing element is mounted on the top part essentially vertically above the mounting of the second routing element on the base part.

3. The furniture item according to claim 1, wherein the first routing element is mounted on the top part essentially vertically above the mounting of the second routing element on the base part.

4. A frame for a height-adjustable furniture item comprising:
    a base part that can be set on the floor;
    a supporting part that can be mounted on a top part of the furniture item;
    an adjustment mechanism by means of which a distance between the base part and the supporting part can be altered; and
    a cable routing arrangement,
    wherein the cable routing arrangement comprises
        a rigid first routing element having a first bearing arrangement configured as a hinge joint,
        a rigid second routing element having a second bearing arrangement configured as a hinge joint, and
        an elastic connecting element,
    wherein the first routing element is mounted on the supporting part via the hinge joint to provide an articulated or hinged connection therebetween,
    wherein the second routing element is mounted on the base part via the hinge joint to provide an articulated or hinged connection therebetween, and
    wherein the connecting element interconnects the first routing element and the second routing element in such a way that they are movable in relation to each other.

5. The frame according to claim 4, wherein the first routing element is mounted on the supporting part essentially vertically above the mounting of the second routing element on the base part.

6. The frame according to claim 4, wherein the first routing element is mounted on the supporting part essentially vertically above the mounting of the second routing element on the base part.

7. A cable routing arrangement for routing cables in an orderly fashion on a furniture item with a base part and a top part that can be adjusted in height relative to the base part, comprising:
    a rigid first routing element,
    a rigid second routing element, and
    a deformable connecting element,
    wherein the first routing element has a first bearing arrangement in the form of a hinge joint configured to be connected to the top part of the furniture item to provide for an articulated or hinged connection therebetween,
    wherein the second routing element has a second bearing arrangement in the form of a hinge joint configured to be connected to the base part of the furniture item to provide for an articulated or hinged connection therebetween, and wherein the first routing element and the second routing element are interconnected via the connecting element in such a way that they are movable in relation to each other.

8. The cable routing arrangement according to claim 7, wherein the connecting element is elastically deformable.

9. The cable routing arrangement according to claim 8, wherein the connecting element is designed to be a spring.

10. The cable routing arrangement according to claim 9, wherein the connecting element has a helical spring.

11. The cable routing arrangement according to claim 7, wherein the first routing element and the second routing element are configured as elongate.

12. The cable routing arrangement according to claim 11, wherein the first bearing arrangement is arranged near a first longitudinal end of the first routing element, the second bearing arrangement is arranged near a first longitudinal end of the second routing element, and the connecting element is designed to connect a second longitudinal end of the first routing element to a second longitudinal end of the second routing element.

13. The cable routing arrangement according to claim 12, wherein the first routing element and the second routing element each have a rod section.

14. The cable routing arrangement according to claim 11, wherein the first routing element and the second routing element each have a rod section.

15. The cable routing arrangement according to claim 7, which comprises a sheath with which the first routing element, the second routing element, and the connecting element can be enclosed.

16. The cable routing arrangement according to claim 15, wherein the sheath is configured as a tube.

* * * * *